(12) United States Patent
Peters (10) Patent No.: US 9,895,760 B2
(45) Date of Patent: Feb. 20, 2018

(54) METHOD AND SYSTEM TO INCREASE HEAT INPUT TO A WELD DURING A SHORT-CIRCUIT ARC WELDING PROCESS

(71) Applicant: Lincoln Global, Inc., City of Industry, CA (US)

(72) Inventor: Steven R Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 245 days.

(21) Appl. No.: 14/622,120

(22) Filed: Feb. 13, 2015

(65) Prior Publication Data

US 2015/0151376 A1 Jun. 4, 2015

Related U.S. Application Data

(63) Continuation-in-part of application No. 14/593,307, filed on Jan. 9, 2015, now abandoned, which is a continuation of application No. 13/764,203, filed on Feb. 11, 2013, now Pat. No. 8,993,927, which is a (Continued)

(51) Int. Cl.
*B23K 9/12* (2006.01)
*B23K 9/09* (2006.01)

(52) U.S. Cl.
CPC .................. *B23K 9/092* (2013.01)

(58) Field of Classification Search
CPC .... B23K 9/1006; B23K 9/0956; B23K 9/125; B23K 9/1012
USPC .. 219/54, 30 R, 69.1, 73, 61.4, 137, 137.71, 219/130.32, 130.4
See application file for complete search history.

(56) References Cited

U.S. PATENT DOCUMENTS 2,566,905 A * 9/1951 Palmer ................ A47J 37/0814
99/329 P
3,657,724 A 4/1972 Feeley
(Continued)

FOREIGN PATENT DOCUMENTS

WO WO 2007/028858 A1 3/2007

OTHER PUBLICATIONS

International Application No. PCT/IB2009/006084, International Search Report & Written Opinion, 9 pages, Nov. 12, 2009.

*Primary Examiner* — David Angwin
*Assistant Examiner* — Jimmy Chou
(74) *Attorney, Agent, or Firm* — Perkins Coie LLP (57) ABSTRACT

A method and a system to control heat input to a weld during an arc welding process. A series of electric arc pulses are generated between an advancing welding electrode and a metal workpiece using an electric arc welding system capable of generating an electric welding waveform to produce the electric arc pulses while manipulating the feed speed and/or direction of the electrode. A cycle of the electric arc welding waveform includes a pinch current phase providing an increasing pinch current level, a peak current phase providing a peak current level, a tail-out current level, and a background current phase providing a background current level. At least one heat-increasing current pulse of the cycle is generated, providing a heat-increasing current level, during the background current phase, where the heat-increasing current level is above the background current level. The cycle of the electric welding waveform with the at least one heat-increasing current pulse may be repeated until the arc welding process is completed.

13 Claims, 10 Drawing Sheets

Related U.S. Application Data continuation of application No. 12/163,047, filed on Jun. 27, 2008, now Pat. No. 8,373,093.

(56) References Cited

U.S. PATENT DOCUMENTS

| | | | | |
|---|---|---|---|---|
| 3,668,360 | A * | 6/1972 | Ballis | B23K 9/0286 219/130.1 |
| 3,775,585 | A | 11/1973 | Okada | |
| 3,789,749 | A * | 2/1974 | Paaskesen | A47J 37/0814 99/391 |
| 4,258,242 | A * | 3/1981 | Fujimori | B23K 9/173 219/137 R |
| 4,397,227 | A * | 8/1983 | Landry | A47J 37/0814 99/334 |
| 4,487,115 | A * | 12/1984 | Su | A47J 37/0842 99/327 |
| 4,544,826 | A | 10/1985 | Nakanishi | |
| 4,639,576 | A * | 1/1987 | Shoemaker | B23K 35/304 219/146.1 |
| 4,954,691 | A | 9/1990 | Parks | |
| 4,972,064 | A | 11/1990 | Stava | |
| 5,001,326 | A | 3/1991 | Stava | |
| 5,003,154 | A | 3/1991 | Parks | |
| 5,148,001 | A | 9/1992 | Stava | |
| 5,317,116 | A * | 5/1994 | Tabata | B23K 9/0734 219/130.31 |
| 5,423,246 | A * | 6/1995 | McNair | A47J 37/0871 99/334 |
| 5,458,052 | A * | 10/1995 | McNair | A47J 37/08 99/332 |
| 5,473,139 | A * | 12/1995 | Matsui | B23K 9/092 219/130.51 |
| 5,528,980 | A * | 6/1996 | McClean | A47J 37/0871 99/385 |
| 5,961,863 | A * | 10/1999 | Stava | B23K 9/092 219/125.11 |
| 6,008,470 | A * | 12/1999 | Zhang | B23K 9/092 219/130.31 |
| 6,034,350 | A | 3/2000 | Heraly | |
| 6,051,810 | A * | 4/2000 | Stava | B23K 9/092 219/130.33 |
| 6,172,333 | B1 * | 1/2001 | Stava | B23K 9/1735 219/130.1 |
| 6,215,100 | B1 | 4/2001 | Stava | |
| 6,232,211 | B1 * | 5/2001 | Tsukahara | H01L 24/11 257/734 |
| 6,267,044 | B1 * | 7/2001 | Friel, Sr. | A47J 37/0814 219/386 |
| 3,384,373 | A1 | 5/2002 | Schwartz | |
| 3,441,342 | A1 | 8/2002 | Hsu | |
| 6,498,321 | B1 | 12/2002 | Fulmer et al. | |
| 6,501,049 | B2 * | 12/2002 | Stava | B23K 9/092 219/130.21 |
| 6,581,512 | B1 * | 6/2003 | Mauffrey; Guy | A47J 37/0878 99/329 P |
| 6,700,097 | B1 * | 3/2004 | Hsu | B23K 9/09 219/130.5 |
| 6,708,602 | B2 * | 3/2004 | Nguyen | A47J 37/08 99/329 P |
| 6,717,107 | B1 * | 4/2004 | Hsu | B23K 9/1056 219/130.51 |
| 6,730,875 | B2 | 5/2004 | Hsu | |
| 6,734,394 | B2 * | 5/2004 | Hsu | B23K 9/1062 219/130.51 |
| 6,794,608 | B2 * | 9/2004 | Flood | B23K 9/1062 219/130.21 |
| 6,833,529 | B2 | 12/2004 | Ueyama | |
| 7,036,424 | B2 * | 5/2006 | Friel, Sr. | A47J 37/0814 219/393 |
| 7,064,290 | B2 | 6/2006 | Blankenship | |
| 7,105,778 | B1 * | 9/2006 | DeLong | A47J 37/0807 219/386 |
| 7,115,834 | B2 * | 10/2006 | Sykes | B23K 9/1006 219/130.1 |
| 7,132,623 | B2 * | 11/2006 | De Miranda | B23K 9/093 219/130.01 |
| 7,170,039 | B2 * | 1/2007 | Lee | A47J 37/0814 219/413 |
| 7,217,904 | B2 | 5/2007 | Blankenship | |
| 7,271,365 | B2 | 9/2007 | Stava et al. | |
| 7,397,015 | B2 * | 7/2008 | Peters | B23K 9/0216 219/130.51 |
| 7,472,644 | B2 * | 1/2009 | Friel, Sr. | A47J 37/0814 99/327 |
| 7,479,295 | B2 * | 1/2009 | Nguyen | A47J 37/08 426/468 |
| D622,091 | S * | 8/2010 | Knox | D7/330 |
| 7,919,728 | B2 | 4/2011 | Era | |
| 8,067,714 | B2 | 11/2011 | Era | |
| 8,203,099 | B2 * | 6/2012 | Peters | B23K 9/04 219/130.1 |
| 8,373,093 | B2 * | 2/2013 | Peters | B23K 9/091 219/130.21 |
| 8,680,431 | B2 | 3/2014 | Stava | |
| 8,937,267 | B2 * | 1/2015 | Peters | B23K 9/092 219/130.31 |
| 8,969,764 | B2 * | 3/2015 | Peters | B23K 9/093 219/130.51 |
| 9,120,172 | B2 * | 9/2015 | Dodge | B23K 9/1043 |
| 9,415,458 | B2 * | 8/2016 | Doyle | B23K 9/0282 |
| 9,481,046 | B2 * | 11/2016 | Peters | B23K 9/1043 |
| 9,533,366 | B2 * | 1/2017 | Peters | B23K 9/093 |
| 2003/0071026 | A1 * | 4/2003 | Hsu | B23K 9/1062 219/137 PS |
| 2004/0074884 | A1 | 4/2004 | Butler | |
| 2004/0079740 | A1 | 4/2004 | Myers | |
| 2005/0051524 | A1 | 3/2005 | Blankenship | |
| 2005/0269297 | A1 | 12/2005 | Buda | |
| 2006/0070983 | A1 | 4/2006 | Narayanan | |
| 2006/0207983 | A1 * | 9/2006 | Myers | B23K 9/092 219/137 PS |
| 2006/0226131 | A1 | 10/2006 | Stava et al. | |
| 2006/0231540 | A1 * | 10/2006 | Stava | B23K 9/092 219/137 PS |
| 2007/0051712 | A1 | 3/2007 | Kooken | |
| 2007/0056944 | A1 | 3/2007 | Artelsmair | |
| 2007/0164007 | A1 | 7/2007 | Peters | |
| 2007/0235434 | A1 * | 10/2007 | Davidson | B23K 9/092 219/130.51 |
| 2007/0241087 | A1 * | 10/2007 | Peters | B23K 9/0216 219/137 PS |
| 2007/0246448 | A1 * | 10/2007 | Nishisaka | B23K 9/092 219/130.51 |
| 2008/0006612 | A1 | 1/2008 | Peters et al. | |
| 2008/0053978 | A1 * | 3/2008 | Peters | B23K 9/025 219/130.5 |
| 2008/0083714 | A1 | 4/2008 | Kamath | |
| 2008/0149610 | A1 * | 6/2008 | Huismann | B23K 9/091 219/137 R |
| 2008/0314884 | A1 * | 12/2008 | Fujiwara | B23K 9/0735 219/130.51 |
| 2009/0026188 | A1 | 1/2009 | Schorghuber | |
| 2011/0114615 | A1 | 5/2011 | Daniel | |
| 2011/0278273 | A1 | 11/2011 | Hirota | |
| 2012/0074115 | A1 * | 3/2012 | Kazmaier | B23K 9/09 219/130.51 |
| 2012/0097655 | A1 | 4/2012 | Daniel | |
| 2012/0118865 | A1 | 5/2012 | Stava | |

* cited by examiner

FIG. 10

METHOD AND SYSTEM TO INCREASE HEAT INPUT TO A WELD DURING A SHORT-CIRCUIT ARC WELDING PROCESS

PRIORITY

The present application is a continuation-in-part of and claims priority to U.S. patent application Ser. No. 14/593,307 filed on Jan. 9, 2015, which is a continuation of U.S. patent application Ser. No. 13/764,203, filed on Feb. 11, 2013, which is a continuation of U.S. application Ser. No. 12/163,047, filed Jun. 27, 2008, now U.S. Pat. No. 8,373,093, and which are incorporated herein by reference in their entirety.

CROSS-REFERENCE TO RELATED APPLICATIONS/INCORPORATION BY REFERENCE

U.S. Pat. No. 4,972,064, issued on Nov. 20, 1990, is incorporated herein by reference in its entirety. U.S. Pat. No. 6,051,810, issued on Apr. 18, 2000, is incorporated herein by reference in its entirety. U.S. Pat. No. 6,498,321, issued on Dec. 24, 2002, is incorporated herein by reference in its entirety. U.S. patent application Ser. No. 11/861,379 filed on Sep. 26, 2007, now U.S. Pat. No. 8,203,099, issued on Jun. 19, 2012, is incorporated herein by reference in its entirety.

TECHNICAL FIELD

Certain embodiments relate to electric arc welding. More particularly, certain embodiments relate to a method of increasing heat input to a weld during a gas metal arc welding (GMAW) short-circuit arc process.

BACKGROUND

Open root welding is used for pipe and single-sided plate welding in situations that preclude welding from both sides of the material. This type of welding is common in the petrochemical and process piping industries. For many years, pipe fabricators have been searching for a faster, easier method to make single-sided open root welds. It is difficult, even for skilled welders, to weld open root pipe. Inflexible positioning makes pipeline welding more difficult, time consuming, and expensive. Higher strength pipe steels are driving a requirement to achieve a low hydrogen weld metal deposit. Gas tungsten arc welding (GTAW) has been an available process capable of achieving the quality requirements, however, GTAW root welds are expensive to make. The gas metal arc welding (GMAW) process has been avoided because of problems with sidewall fusion and lack of penetration.

Conventional constant voltage (CV) GMAW welding processes produce a flat internal bead, or "suck back" where the bead shrinks back into the root due to high weld puddle temperatures. GTAW welding produces good pipe welds, however, travel speeds may be slow and heat input may be high. Stick welding with cellulose electrodes provides good fusion characteristics but leaves deep wagon tracks (requiring more labor for grinding), a very convex root weld, and a high hydrogen deposit.

The Surface Tension Transfer (STT) process has been developed to make single-sided root welds on pipe, for example. STT is a controlled short-circuit transfer GMAW process that produces a low hydrogen weld deposit and makes it easier to achieve a high quality root weld in all positions. STT eliminates the lack of penetration and poor sidewall fusion problems encountered when using the traditional short-arc GMAW process.

The STT process produces a low hydrogen weld metal deposit in open root joints with easier operation, better back beads, better sidewall fusion, and less spatter and fumes than other processes. STT differs from the traditional GMAW short-arc welding process in that the arc current is precisely controlled independently from the wire feed speed. Also, the arc current is carefully regulated to reduce puddle agitation and to eliminate violent "explosions" that occur during the traditional short-arc GMAW process.

Even though the current STT process is significantly better than the traditional short-arc GMAW process, especially for root welding application, the ability to better control heat input into the weld to achieve even better penetration without increasing the weld puddle fluidity is desired.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY

A first embodiment of the present invention comprises a method of increasing heat input to a weld during an arc welding process by generating a series of electric arc pulses between an advancing welding electrode and a metal workpiece using an electric arc welding system capable of generating an electric welding waveform to produce the electric arc pulses. The method includes:

(a) regulating an output current level of the waveform to a background current level to sustain an electric arc between the electrode and the workpiece, producing a molten metal ball on a distal end of the electrode;

(b) dropping the output current level below the background current level in response to the molten metal ball shorting to the workpiece and extinguishing the electric arc, to allow the molten metal ball to wet into a puddle on the workpiece;

(c) automatically increasing the output current level above the background current level to induce the molten metal ball to pinch off from the distal end of the electrode;

(d) decreasing the output current level below the background current level as the molten metal ball pinches off from the distal end of the electrode onto the workpiece, re-establishing an electric arc between the electrode and the workpiece;

(e) increasing the output current level to a peak current level of the waveform in response to re-establishing the electric arc;

(f) decreasing the output current level toward the background current level, producing a next molten metal ball on the distal end of the electrode;

(g) pulsing the output current level, between the background current level and an intermediate current level being between the background current level and the peak current level, at a pre-defined pulse rate until a next short is established between the next molten metal ball and the workpiece; and (h) repeating steps (b) through (g) until the arc welding process is completed.

Another embodiment of the present invention comprises a method of increasing heat input to a weld during an arc welding process by generating a series of electric arc pulses between an advancing welding electrode and a metal workpiece using an electric arc welding system capable of generating an electric welding waveform to produce the electric arc pulses. The method includes:

(a) generating a base cycle of the electric welding waveform having a background current phase providing a background current level, a peak current phase providing a peak current level, and a tail-out current phase providing a monotonically decreasing tail-out current level;

(b) generating a pinch current phase of the electric welding waveform, between the background current phase and the peak current phase, providing a monotonically increasing pinch current level; and (c) generating at least one heat-increasing current pulse of the electric welding waveform, during the background current phase, providing an intermediate current level being between the background current level and the peak current level.

The method may further include periodically repeating the background current phase, the pinch current phase, the peak current phase, and the tail-out current phase in succession such that the background current phase includes the at least one heat-increasing current pulse. The method may also include decreasing a current level of the electric welding waveform below the background current level at an end of the background current phase, and decreasing a current level of the electric welding waveform below the background current level at an end of the pinch current phase. The method can further include manipulating a wire feed speed and/or a feed direction of the welding electrode while providing the welding waveform to the welding electrode. In some embodiments, the welding waveform is an AC welding waveform. In some embodiments, the peak current phase and the pinch current phase are at a first polarity and the background current level is at a second polarity that is opposite the first polarity.

A further embodiment of the present invention comprises a system for increasing heat input to a weld during an arc welding process by generating an electric welding waveform to produce a series of electric arc pulses between an advancing welding electrode and a metal workpiece. The system includes a first configuration of electronic components to generate a background current phase, a peak current phase, and a tail-out current phase of the electric welding waveform, wherein the background current phase provides a background current level, the peak current phase provides a peak current level, and the tail-out current phase provides a monotonically decreasing tail-out current level. The system also includes a second configuration of electronic components to generate a pinch current phase of the electric welding waveform, wherein the pinch current phase provides a monotonically increasing pinch current level. The system further includes a third configuration of electronic components to generate at least one heat-increasing current pulse of the electric welding waveform during the background current phase, wherein the at least one heat-increasing current pulse provides an intermediate current level that is between the background current level and the peak current level. The system may further include a fourth configuration of electronic components to decrease a current level of the electric welding waveform below the background current level at an end of the background current phase in response to the electrode shorting to the workpiece. The system may also include a fifth configuration of electronic components to decrease a current level of the electric welding waveform below the background current level at an end of the pinch current phase in anticipation of the electrode de-shorting from the workpiece.

Another embodiment of the present invention comprises a system for increasing heat input to a weld during an arc welding process by generating an electric welding waveform to produce a series of electric arc pulses between an advancing welding electrode and a metal workpiece. The system includes means for generating a background current phase, a peak current phase, and a tail-out current phase of the electric welding waveform, wherein the background current phase provides a background current level, the peak current phase provides a peak current level, and the tail-out current phase provides a decreasing tail-out current level. The system further includes means for generating a pinch current phase of the electric welding waveform, wherein the pinch current phase provides an increasing pinch current level. The system also includes means for generating at least one heat-increasing current pulse of the electric welding waveform during the background current phase, wherein the at least one heat-increasing current pulse provides an intermediate current level that is between the background current level and the peak current level. The system further includes means for periodically re-generating the background current phase, the pinch current phase, the peak current phase, and the tail-out current phase in succession such that the background current phase includes the at least one heat-increasing current pulse. The system may also include means for decreasing a current level of the electric welding waveform below the background current level at an end of the background current phase in response to the electrode shorting to the workpiece. The system may further include means for decreasing a current level of the electric welding waveform below the background current level at an end of the pinch current phase in anticipation of the electrode de-shorting from the workpiece.

In accordance with an embodiment of the present invention, the arc welding process may be a gas metal arc welding (GMAW) process using, for example, argon and $CO_2$ as shielding gases, or $CO_2$ by itself. The welding electrode may include steel or stainless steel. In accordance with an embodiment of the present invention, the background current level may be about 70 amps, the peak current level may be about 330 amps, and the intermediate current level may be about 210 amps. In accordance with an embodiment of the present invention, the pre-defined pulse rate of the heat-increasing current pulses may be about 333 Hz and a wire feed speed of the arc welding process may be about 150 inches per minute.

In another embodiment of the invention, a welding system can include a power supply that generates an output current waveform and provides the output current waveform to an electrode and a wire feeder that advances the electrode to a workpiece. The system can also include a controller that controls the power supply such that the output current waveform has a plurality of peak current pulse portions and a plurality of background current portions, where each of the plurality of the peak portions are separated by one of the background current portions, and the controller controls the wire feeder such that at least one of a feed speed and a feed direction of the electrode are manipulated while controlling the power supply. In addition, the controller can control the power supply such that the power supply generates a plurality of current pulses during each of the background current portions in between the peak current pulse portions. The plurality of current pulses during the background current portions can have a current level which is intermediate to a first current level for the background currents portions and a current level for each of the peak current portions. The current level for each of the plurality of current pulses in any one background current portion can be the same.

In some embodiments, the controller controls the power supply such that a pinch current portion is generated between the background current portion and the peak current pulse portions, and a second current level is generated in the waveform below the first current level for the background currents portions. In some embodiments, the feed speed is reduced below a background speed set during the background current portions, with the feed speed reduction occurring during at least a portion of at least one of the second current level, the pinch current portion and the peak current pulse portion. In some embodiments, the feed direction is reversed during at least a portion of at least one of the second current level, the pinch current portion and the peak current pulse portion. In some embodiments, the welding waveform is an AC welding waveform. In some embodiments, the peak current phase and the pinch current phase are at a first polarity and the background current level is at a second polarity that is opposite the first polarity.

These and other features of the claimed invention, as well as details of illustrated embodiments thereof, will be more fully understood from the following description and drawings.

DETAILED DESCRIPTION OF EXEMPLARY EMBODIMENTS

Figure 1A:
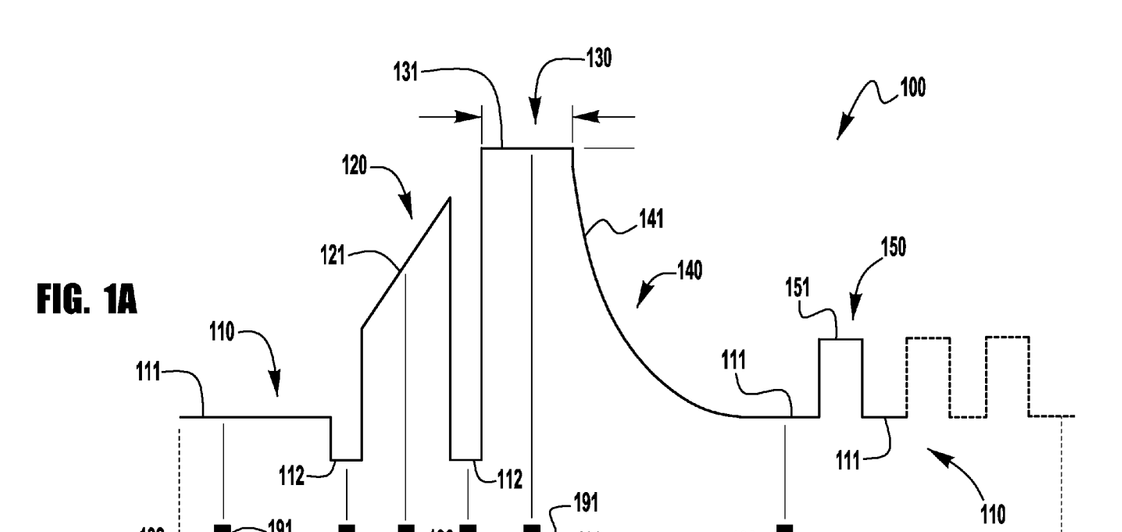
FIG. 1A illustrates an exemplary embodiment of a cycle of an electric welding waveform used in an arc welding process to increase heat input to a weld.
Figure 1B:
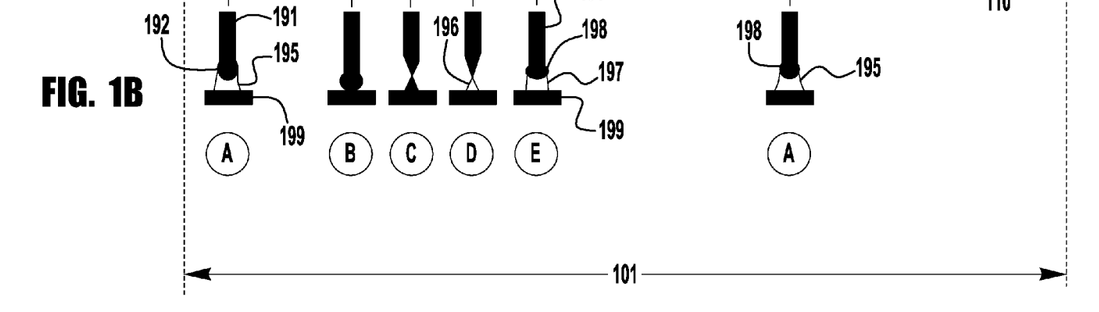
FIG. 1B illustrates the various stages of the arc welding process over the cycle of FIG. 1A using the electric welding waveform of FIG. 1A, showing the relationship between a welding electrode and a metal workpiece.

FIG. 1A illustrates an exemplary embodiment of a cycle 101 of an electric welding waveform 100 used in an arc welding process to increase heat input to a weld. FIG. 1B illustrates the various stages (A-E) of the arc welding process over the cycle 101 using the electric welding waveform of FIG. 1A, showing the relationship between a welding electrode 191 and a metal workpiece 199. During an arc welding process, a series of electric arc pulses are generated between the advancing electrode 191 and the metal workpiece 199 using an electric arc welding system capable of generating the electric welding waveform 100 to produce the electric arc pulses. In general, the cycle 101 periodically repeats during the arc welding process to produce the resultant weld. However, the cycle 101 may repeat without the same number of heat increasing pulses 150 and possibly without a pinch current phase 120 if a short condition does not occur.

The cycle 101 of the electric welding waveform 100 includes a background current phase 110 providing a background current level 111, a pinch current phase 120 providing a monotonically increasing pinch current level 121, a peak current phase 130 providing a peak current level 131, and a tail-out current phase 140 providing a monotonically decreasing tail-out current level 141.

During the background current phase 110, an electric arc 195 is sustained between the electrode 191 and the workpiece 199 producing a molten metal ball 192 on a distal end of the electrode 191 (see stage A in FIG. 1B). At stage B, the molten metal ball 192, still connected to the electrode 191, shorts to the workpiece 199. When the short occurs, the arc 195 is extinguished and the current level of the waveform 100 is dropped at or below the background current level 111 to a current level 112, allowing the molten ball 192 to wet into a puddle on the workpiece 199.

During the pinch current phase 120, the current level of the waveform 100 is increased monotonically (e.g., ramped upward) above the background current level 111, providing the increasing pinch current level 121 which causes the shorted molten metal ball 192 to begin to pinch off from the distal end of the electrode 191 into the puddle of the workpiece 199 as shown in stage C of FIG. 1B. As the molten metal ball 192 is about to pinch off from the electrode 191, the current level of the waveform 100 is again dropped below the background current level 111 to a current level 112 to avoid spatter, and an arc 196 is re-established between the electrode 191 and the workpiece 199.

Once the arc 196 is re-established, the waveform 100 enters the peak current phase 130. During the peak current phase 130, the current level of the waveform 100 is increased to and held at the peak current level 131. In accordance with an embodiment, the peak current level 131 is the highest current level of the waveform 100 and establishes an arc 197 between the electrode 191 and the workpiece 199 of sufficient strength to begin forming a next molten metal ball 198 at the distal end of the electrode 191.

After the peak current phase 130, the waveform 100 enters the tail-out current phase 140. During the tail-out current phase 140, the current level of the waveform 100 monotonically (e.g., exponentially) decreases toward the background current level 111 providing the decreasing tail-out current level 141. The current of the waveform 100 inputs heat into the weld. The tail-out current phase 140 acts as a coarse heat control phase for the waveform 100 whereas the background current phase 110 acts as a fine heat control phase for the waveform 100. However, in certain arc welding applications, it may be desirable to provide additional heat input control.

After the tail-out current phase 140, the background current phase 110 is again entered, providing the background current level 111 and producing a substantially uniform next molten metal ball 198 at the distal end of the electrode 191 (stage A). During the background current phase 110, at least one heat-increasing current pulse 150 is generated, providing an intermediate current level 151 that is between the background current level 111 and the peak current level 131. The heat increasing current pulse 150 may be periodically repeated within the background current phase 110 until a next short between the molten metal ball 198 and the workpiece 199 occurs, at which time the arc 195 is extinguished and the current level of the waveform 100 is dropped below the background current level 111 to a current level 112, allowing the next molten ball 198 to wet into the puddle on the workpiece 199 (stage B).

The heat-increasing current pulses 150 serve to re-heat the puddle and surrounding area to increase penetration. Such an increase in heat provided by the heat-increasing current pulses 150 may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer. Again, in general, the cycle 101 periodically repeats during the arc welding process to produce the resultant weld. However, the cycle 101 may repeat without the same number of heat increasing pulses 151 and possibly without the pinch current phase 120 if a short does not occur. As used herein, the term "current level" refers to a current amplitude which is substantially steady but may have some variations due to the somewhat in-exact nature of producing an electric welding waveform.

As an example, in accordance with an embodiment of the present invention, the arc welding process is a gas metal arc welding (GMAW) process using argon and carbon dioxide as shielding gases. The background current level 111 is about 70 amps, the peak current level 131 is about 330 amps, and the intermediate current level 151 is about 210 amps. The pulsewidth of a single heat-increasing pulse 150 is about 1 millisecond and may be repeated about every 3 milliseconds, up to three to six pulses during the background current phase 110. The period of the cycle 101 is about 15 milliseconds.

Figure 2:
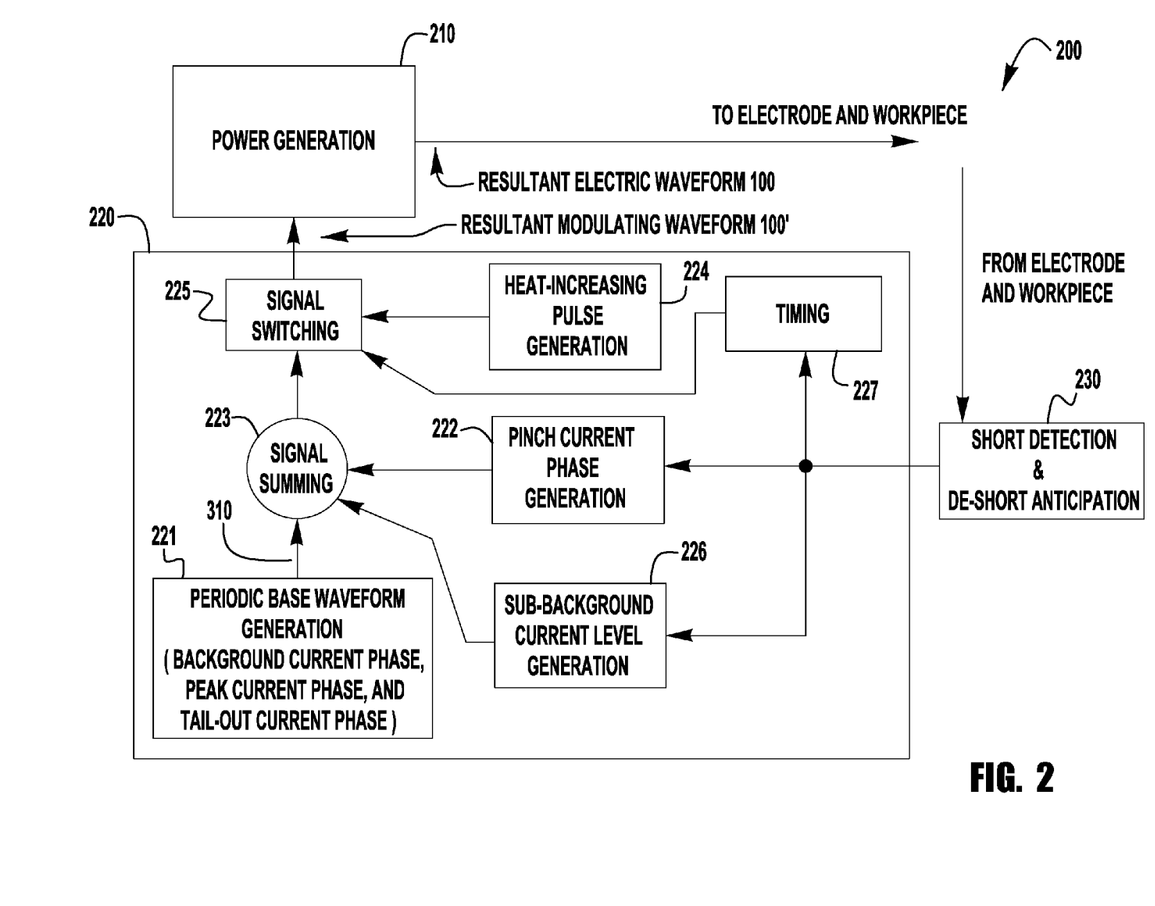
FIG. 2 illustrates a functional block diagram of a first exemplary embodiment of a system for generating the electric welding waveform of FIG. 1.

FIG. 2 illustrates a functional block diagram of a first exemplary embodiment of a system 200 for generating the electric welding waveform 100 of FIG. 1. The system 200 provides power generation capability 210 and modulating waveform generation and shaping capability 220 to create a modulating waveform 100'. The system 200 also provides short detection and premonition detection (de-short anticipation) capability 230 to detect when a short condition occurs between the electrode 191 and the workpiece 199 and to anticipate when a short condition is about to terminate (de-short condition) as a molten metal ball (e.g., 192) pinches off into the puddle on the workpiece 199.

Figure 3A:
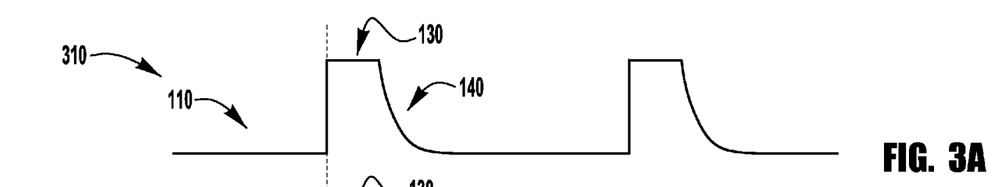
FIGS. 3A-3D illustrate exemplary embodiments of portions of a modulating waveform as generated by the various capabilities of the system of FIG. 2.

A modulating waveform 100' generated by the modulating waveform generation and shaping capability 220 is used to modulate the power generation capability 210 which provides electric current to the electrode 191 and workpiece 199 in the form of the electric welding waveform 100. The modulating waveform generation and shaping capability 220 includes a periodic base waveform generation capability 221. FIGS. 3A-3D illustrate exemplary embodiments of portions of the modulating waveform 100' as generated by the various capabilities of the system 200 of FIG. 2. FIG. 3A illustrates a periodic base waveform portion 310 generated by the periodic base waveform generation capability 221. The periodic base waveform generation capability 221 provides the generation of the background current phase 110, peak current phase 130, and tail-out current phase 140 of the modulating waveform 100' in a periodic manner.

Figure 3B:
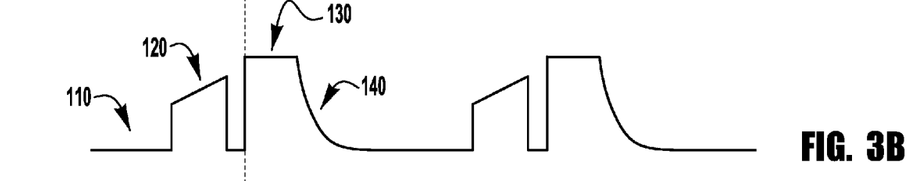

The modulating waveform generation and shaping capability 220 also includes a pinch current phase generation capability 222. FIG. 3B illustrates the periodic base waveform portion 310 of FIG. 3A having the pinch current phase 120 added. In accordance with an embodiment of the present invention, the pinch current phase 120 may be summed with the periodic base waveform portion 310 using a signal summing capability 223 of the modulating waveform generation and shaping capability 220.

Figures 3C, 3D:
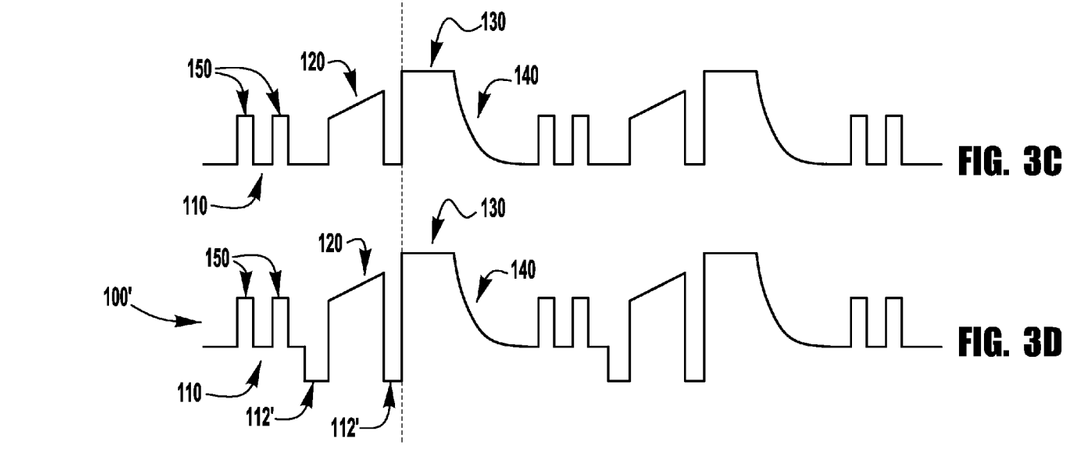

The modulating waveform generation and shaping capability 220 further includes a heat-increasing pulse generation capability 224. FIG. 3C illustrates the periodic base waveform portion 310 of FIG. 3A having the pinch current phase 120 of FIG. 3B and having the heat-increasing pulses 150 switched in during the background current phase 110. In accordance with an embodiment of the present invention, the heat-increasing current pulses 150 may be switched in during the background current phase 110 using a signal switching capability 225 of the modulating waveform generation and shaping capability 220.

The modulating waveform generation and shaping capability 220 also includes a sub-background current level generation (current reducing) capability 226. FIG. 3D illustrates the periodic base waveform portion 310 of FIG. 3A having the pinch current phase 120 of FIG. 3B, the background current phase 110 having the heat-increasing current pulses 150 as shown in FIG. 3C, and having the sub-background current portions 112' added. In accordance with an embodiment of the present invention, the sub-background current portions 112' may be summed with the periodic base waveform portion 310 and the pinch current phase 120 using the signal summing capability 223 of the waveform generation and shaping capability 220.

The resultant modulating waveform 100' of FIG. 3D is used to modulate the power generation capability 210 to provide the actual current levels (111, 112, 121, 131, 141, 151) of the various portions of the electric welding waveform 100 to the electrode 191 and the workpiece 199 as shown in FIG. 1 and FIG. 2.

During a welding process using the system 200, the short detection and de-short anticipation capability 230 monitors current and voltage at the electrode 191 and the workpiece 199 and detects when a short condition occurs between the electrode 191 and the workpiece 199 and also anticipates when the short condition is about to terminate (de-short condition). When a short condition occurs, the sub-background current level capability 226 immediately pulls the current level of the waveform 100 below the background current level 110 to a current level 112, in response to the short condition being detected, allowing a molten metal ball to wet into a puddle on the workpiece 199 as described previously herein. Then the pinch current phase generation capability 222 applies the monotonically increasing pinch current level 121 to the waveform 100.

When a de-short condition is anticipated (i.e., the molten metal ball is about to pinch off from the distal end of the electrode), the sub-background current level capability 226 again pulls the current level of the waveform 100 below the background current level 110 to the current level 112, in response to the de-short condition being anticipated, in order to avoid splatter. Furthermore, a timing capability 227 of the waveform generation and shaping capability 220 is triggered. The timing capability 227 counts down over the time segments occupied by the peak current phase 130 and the tail-out current phase 140 until the waveform 100 reaches the background current phase 110.

In accordance with an embodiment of the present invention, the timing capability is pre-programmed with the amount of time occurring between the de-short condition and entrance into the background current phase 110. Once the timing capability 227 finishes counting down, indicating that the background current phase 110 has been entered, the signal switching capability 225 is triggered to switch in the heat-increasing pulses 150 from the heat-increasing pulse generation capability 224. The heat-increasing pulses 150 are switched into the waveform 100 during the background current phase 110 until a next short condition is detected.

The various functional capabilities of the system 200 of FIG. 2 may be implemented using configurations of electronic components which may include analog and/or digital electronic components. Such configurations of electronic components may include, for example, pulse generators, timers, counters, rectifiers, transistors, inverters, oscillators, switches, transformers, wave shapers, amplifiers, state machines, digital signal processors, microprocessors, and microcontrollers. Portions of such configurations may be programmable in order to provide flexibility in implementation. Various examples of such configurations of electronic components may be found in U.S. Pat. No. 4,972,064, U.S. Pat. No. 6,051,810, U.S. Pat. No. 6,498,321, and U.S. patent application Ser. No. 11/861,379, each of which is incorporated herein by reference in its entirety.

In accordance with an embodiment of the present invention, the system 200 includes a first configuration of electronic components to generate the background current phase 110, the peak current phase 130, and the tail-out current phase 140 of the electric welding waveform 100. The system 200 further includes a second configuration of electronic components to generate the pinch current phase 120 of the electric welding waveform 100. The system 200 also includes a third configuration of electronic components to generate at least one heat-increasing current pulse 150 of the electric welding waveform 100 during the background current phase 110.

In accordance with an embodiment of the present invention, the system 200 also includes a fourth configuration of electronic components to decrease the current level of the electric welding waveform 100 below the background current level at an end of the background current phase 110 in response to the electrode shorting to the workpiece. The system 200 further includes a fifth configuration of electronic components to decrease the current level of the electric welding waveform 100 below the background current level at an end of the pinch current phase 120 in anticipation of the electrode de-shorting from the workpiece.

The first through fifth configurations of electronic components may not necessarily be independent of each other but may share certain electronic components. For example, in accordance with an embodiment of the present invention, many of the electronic components of the first configuration may be the same as many of the electronic components of the third configuration. Similarly, many of the electronic components of the fourth configuration may be the same as many of the electronic components of the fifth configuration. Other shared components may be possible as well, in accordance with various embodiments of the present invention.

The functional implementation shown in FIG. 2 illustrates one exemplary embodiment. Other embodiments are possible as well. For example, in accordance with another embodiment, the pinch current phase 120 may be switched into the modulating waveform 100' via signal switching capability 225, instead of being summed in via signal summing capability 223. Similarly, the heat-increasing pulses 150 may be summed into the modulating waveform 100' via signal summing capability 223, instead of being switched in via signal switching capability 225. In accordance with another embodiment, the sub-background current level generation capability 226 may not be present, or may be optional, allowing generation of a modulating waveform that does not include the current level portions 112'. Other modified embodiments are possible as well, which result in generating the electric welding waveform 100 of FIG. 1 or similar waveforms having at least one heat-increasing current pulse during a background current phase.

Figure 4:
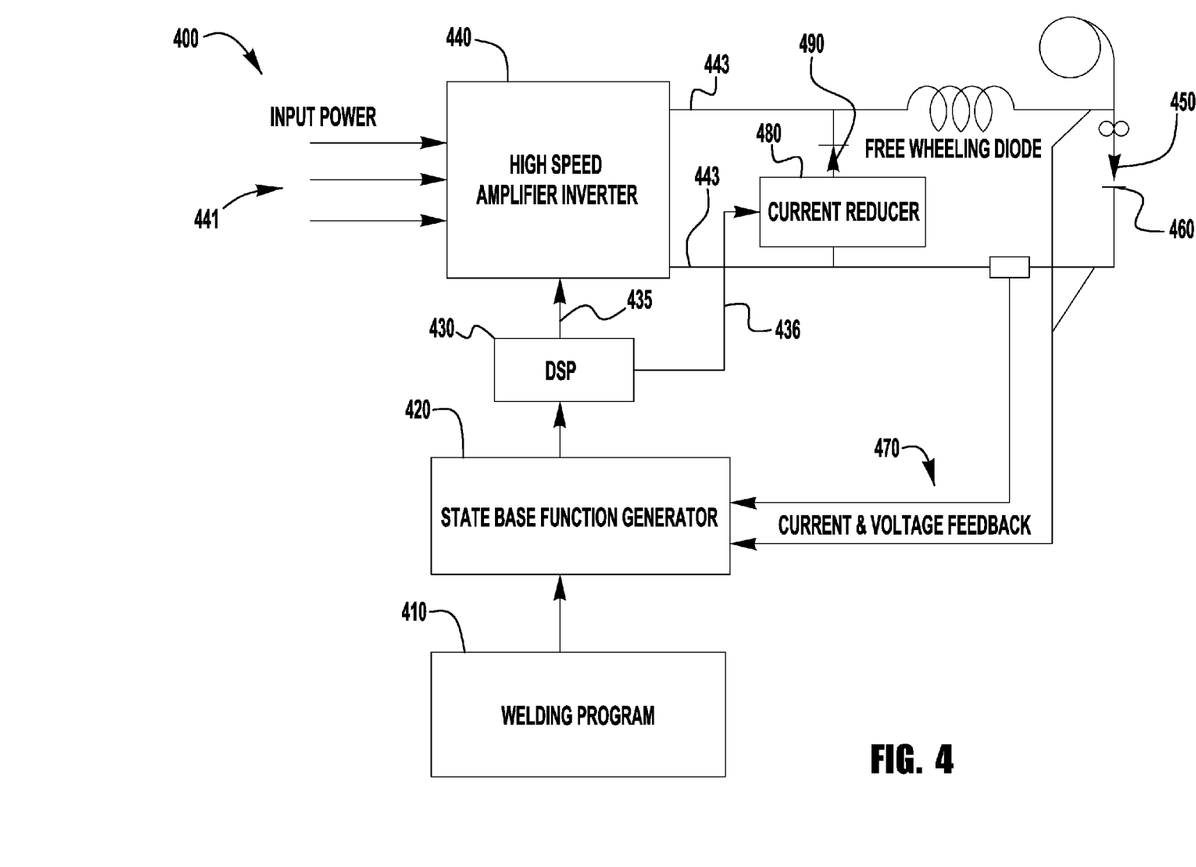
FIG. 4 illustrates a functional block diagram of a second exemplary embodiment of a system for generating the electric welding waveform of FIG. 1.

FIG. 4 illustrates a functional block diagram of a second exemplary embodiment of a system 400 for generating the electric welding waveform 100 of FIG. 1. The system 400 is a state machine type of system as is described herein. The Lincoln Electric Power Wave® 450 system is an example of a state machine type of welding system.

The system 400 includes a welding program 410 loaded onto a state based function generator 420. In accordance with an embodiment of the present invention, the state based function generator 420 includes a programmable microprocessor device. The welding program 410 includes the software instructions for generating an electric welding waveform. The system further includes a digital signal processor (DSP) 430 operationally interfacing to the state based function generator 420. The system also includes a high speed amplifier inverter 440 operationally interfacing to the DSP 430.

The DSP 430 takes its instructions from the state based function generator 420 and controls the high speed amplifier inverter 440. The high speed amplifier inverter 440 transforms a high voltage input power 441 into a low voltage welding output power in accordance with control signals 435 from the DSP 430. For example, in accordance with an embodiment of the present invention, the DSP 430 provides control signals 435 which determine a firing angle (timing of switch activation) for the high speed amplifier inverter 440 to produce various phases of an electric welding waveform.

The outputs 442 and 443 of the high speed amplifier inverter 440 are operationally connected to a welding electrode 450 and a workpiece 460 respectively to provide a welding current which forms an electric arc between the electrode 450 and the workpiece 460. The system 400 also includes voltage and current feedback capability 470 which senses a voltage between the electrode 450 and the workpiece 460 and which senses current flowing through the welding circuit formed by the electrode 450, the workpiece 460, and high speed amplifier inverter 440. The sensed current and voltage are used by the state based function generator 420 to detect shorting of the electrode 450 to the workpiece 460 (i.e., a short condition) and to detect when a molten metal ball is about to pinch off from the electrode 450 (i.e., a de-short condition).

The system 400 further includes a current reducer 480 and a diode 490. The current reducer 480 and the diode 490 are operationally connected between the outputs 442 and 443 of the high speed amplifier inverter 440. The current reducer 480 also operationally interfaces to the DSP 430. When a short condition occurs between the electrode 450 and the workpiece 460, the DSP 430 commands the current reducer 480, via a control signal 436, to pull the current level through the welding circuit below a predefined background current level. Similarly, when a de-short condition occurs (i.e., a molten metal ball pinches off from the distal end of the electrode 450) the DSP 430 commands the current reducer 480 to pull the current level through the welding circuit below a predefined background current level. In accordance with an embodiment of the present invention, the current reducer 480 includes a Darlington switch, a resistor, and a snubber.

Figure 5:
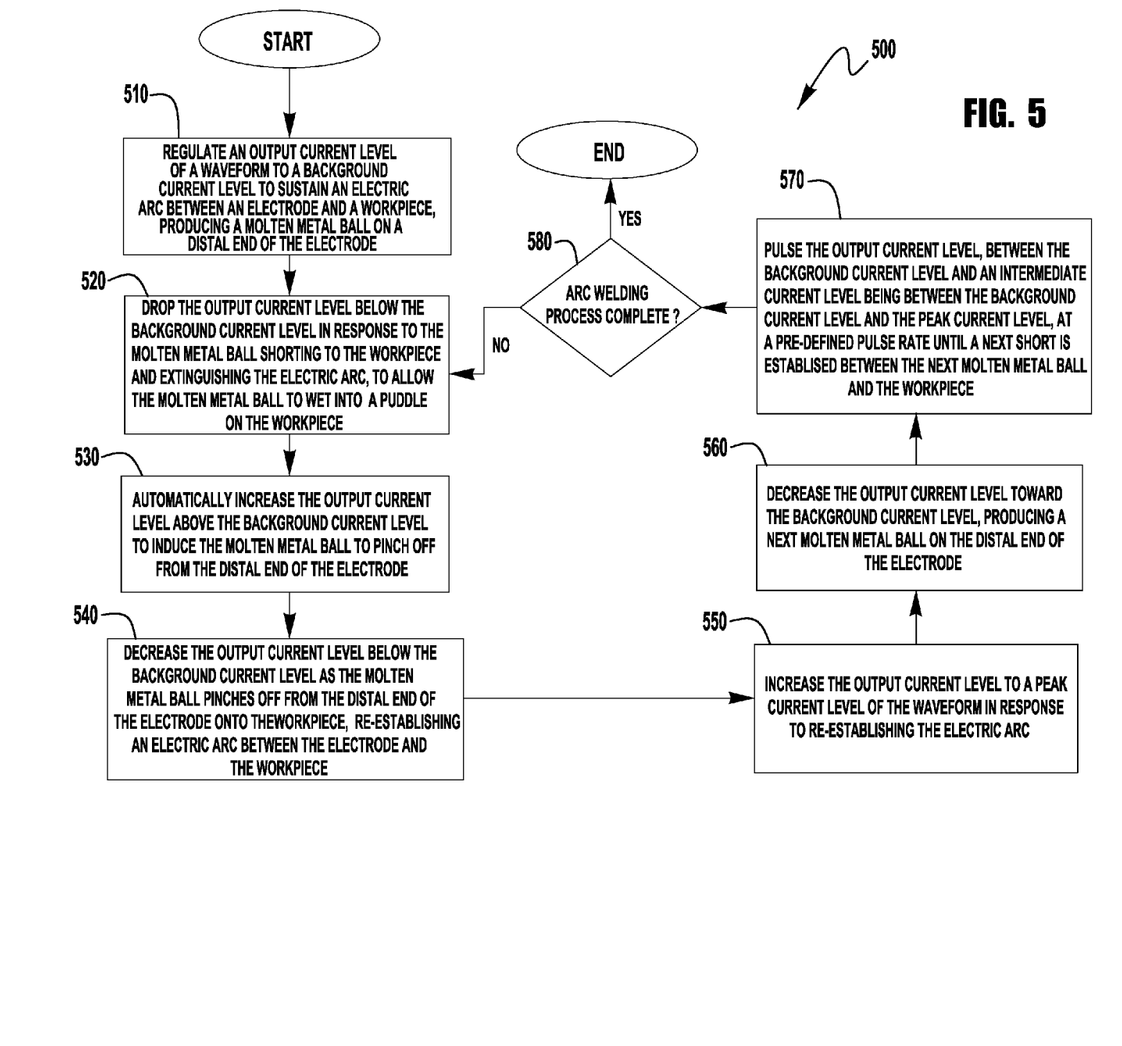
FIG. 5 illustrates a flowchart of a first exemplary embodiment of a method of increasing heat input to a weld during an arc welding process using the electric welding waveform of FIG. 1 and the system of FIG. 2 or the system of FIG. 4.

FIG. 5 illustrates a flowchart of a first exemplary embodiment of a method 500 of increasing heat input to a weld during an arc welding process using the electric welding waveform 100 of FIG. 1 and the system 200 of FIG. 2 or the system 400 of FIG. 4. In step 510, regulate an output current level of the waveform 100 to a background current level 111 to sustain an electric arc 195 between an electrode (e.g., 191 or 450) and a workpiece (e.g., 199 or 460), producing a molten metal ball 192 on a distal end of the electrode (e.g., 191 or 450). In step 520, drop the output current level below the background current level 111 in response to the molten metal ball 192 shorting to the workpiece (e.g., 199 or 460) and extinguishing the electric arc 195, to allow the molten metal ball 192 to wet into a puddle on the workpiece (e.g., 199 or 460). In step 530, automatically increase the output current level above the background current level 111 to induce the molten metal ball 192 to pinch off from the distal end of the electrode (e.g., 191 or 450).

In step 540, decrease the output current level below the background current level 111 as the molten metal ball 192 pinches off from the distal end of the electrode (e.g., 191 or 450) onto the workpiece (e.g., 199 or 460), re-establishing an electric arc 196 between the electrode (e.g., 191 or 450) and the workpiece (e.g., 199 or 460). In step 550, increase the output current level to a peak current level 131 of the waveform 100 in response to re-establishing an electric arc 196. In step 560, decrease the output current level toward the background current level 111, producing a next molten metal ball 198 on the distal end of the electrode (e.g., 191 or 450). In step 570, pulse the output current level, between the background current level 111 and an intermediate current level 151 being between the background current level 111 and the peak current level 131, at a pre-defined pulse rate until a next short is established between the next molten metal ball 198 and the workpiece (e.g., 199 or 460). In step 580, if the arc welding process is not completed, then proceed back to step 520, otherwise, end.

Figures 6A, 6B:
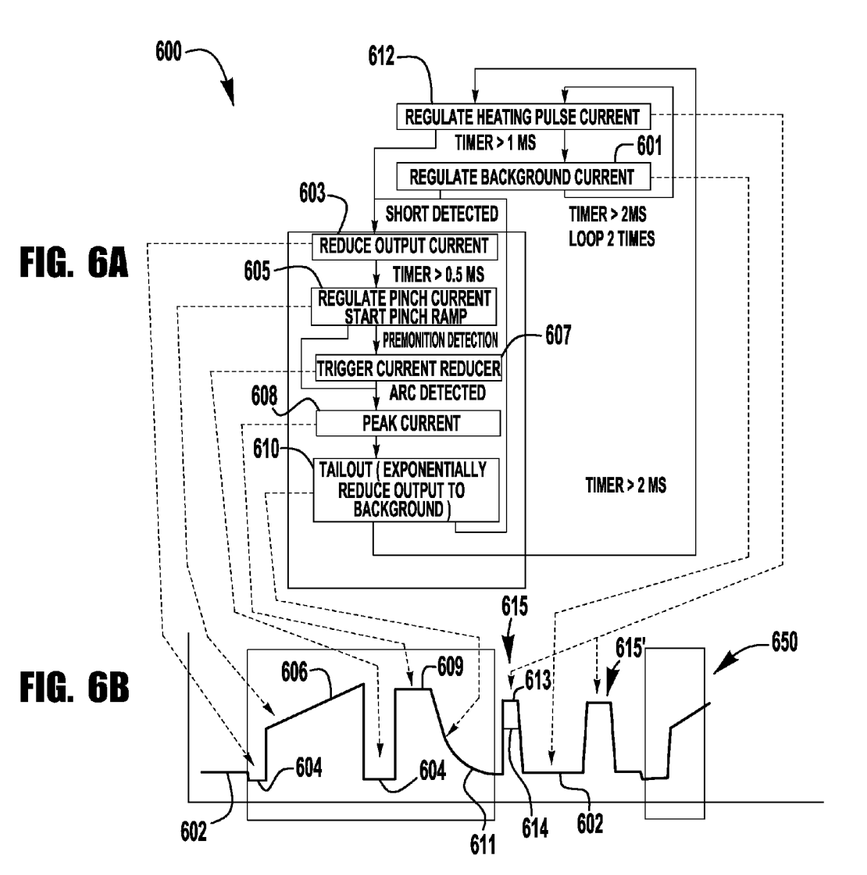
FIGS. 6A-6B illustrate a flowchart and resulting electric welding waveform of a second exemplary embodiment of a method of increasing heat input to a weld during an arc welding process using the system of FIG. 4.

FIGS. 6A-6B illustrate a flowchart and resulting electric welding waveform 650 of a second exemplary embodiment of a method 600 of increasing heat input to a weld during an arc welding process using the system 400 of FIG. 4. In step 601, regulate an output current level of an electric welding waveform 650 to a background current level 602. When a short condition is detected, then in step 603, reduce the output current level to a sub-level 604 being below the background current level 602 by triggering the current reducer 480. In step 605, start ramping the output current level according to a pinch current ramp 606. When a de-short condition (pinch off) is detected, then in step 607, reduce the output current level again to a sub-level 604 by triggering the current reducer 480.

In step 608, regulate the output current level to a peak current level 609 in response to re-establishing an arc between the electrode 450 and the workpiece 460. In step 610, decrease the output current level from the peak current level 609 toward the background current level 602 according to a monotonically decreasing tail-out current ramp 611. In step 612, regulate the output current level to a heat increasing current level 613 during a first pulse interval 614 forming a heat increasing current pulse 615.

The method 600 may alternate between step 601 and step 612 (i.e., the output current may switch back and forth between the heat increasing current level 613 and the background current level 602 forming subsequent heat increasing current pulses) for a pre-determined number of times, or until a next short condition is detected. Furthermore, in accordance with an embodiment of the present invention, the pulse width and amplitude of successive heat increasing current pulses 615' may be the same as or different from the pulse width and amplitude of the first heat increasing current pulse 615, depending on the specifics of the welding operation (e.g., weld metals, shielding gases, etc.).

Figure 7:
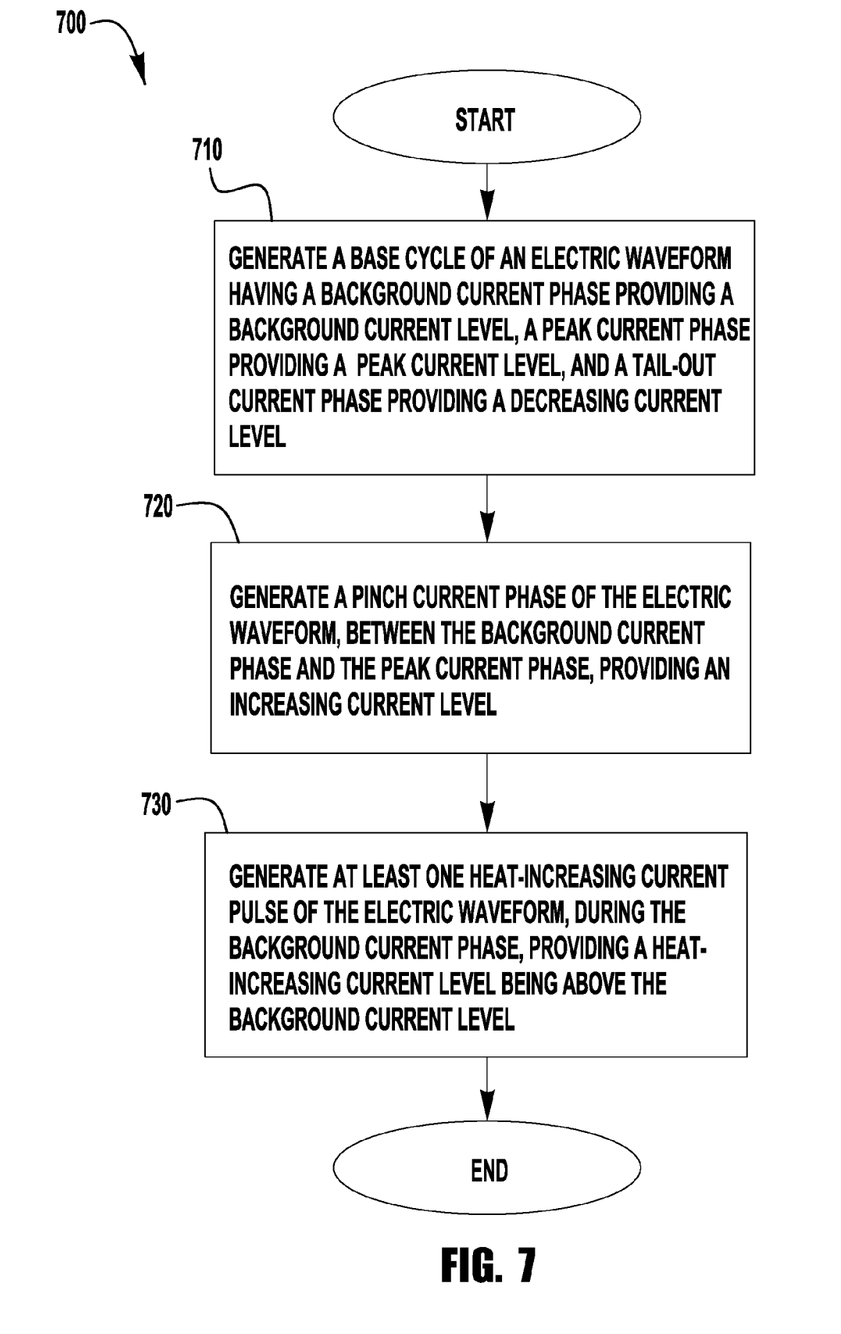
FIG. 7 illustrates a flowchart of a third exemplary embodiment of a method of increasing heat input to a weld during an arc welding process using the electric welding waveform of FIG. 1 or the electric welding waveform of FIG. 6B and the system of FIG. 2 or the system of FIG. 4.

FIG. 7 illustrates a flowchart of a third exemplary embodiment of a method 700 of increasing heat input to a weld during an arc welding process using the electric welding waveform 100 of FIG. 1 or the electric welding waveform 650 of FIG. 6B and the system 200 of FIG. 2 or the system 400 of FIG. 4. In step 710, generate a base cycle (e.g., 310) of an electric welding waveform (e.g., 100) having a background current phase (e.g., 110) providing a background current level (e.g., 111), a peak current phase (e.g., 130) providing a peak current level (e.g., 131), and a tail-out current phase (e.g., 140) providing a decreasing tail-out current level (e.g., 141). In step 720, generate a pinch current phase (e.g., 120) of the electric welding waveform (e.g., 100), between the background current phase (e.g., 110) and the peak current phase (e.g., 130), providing an increasing pinch current level (e.g., 121). In step 730, generate at least one heat-increasing current pulse (e.g., 150) of the electric welding waveform (e.g., 100), during the background current phase (e.g., 110), providing an intermediate current level (e.g., 151) being between the background current level (e.g., 111) and the peak current level (e.g., 131).

In summary, a method and a system to increase heat input to a weld during an arc welding process is disclosed. A series of electric arc pulses are generated between an advancing welding electrode and a metal workpiece using an electric arc welding system capable of generating an electric welding waveform to produce the electric arc pulses. A cycle of the electric welding waveform includes a pinch current phase providing an increasing pinch current level, a peak current phase providing a peak current level, a tail-out current phase providing a decreasing tail-out current level, and a background current phase providing a background current level. At least one heat-increasing current pulse of the cycle is generated, providing a heat-increasing current level, during the background current phase, where the heat-increasing current level is above the background current level. The cycle of the electric welding waveform with the at least one heat-increasing current pulse may be repeated until the arc welding process is completed. The heat-increasing current pulses serve to re-heat the puddle and surrounding area to increase penetration. Such an increase in heat provided by the heat-increasing current pulses may be desired in, for example, the welding of an open root joint in order to provide better penetration without increasing the fluidity of the puddle. The heat increasing pulses are not so large in amplitude as to transfer droplets across the arc and are not so wide in pulsewidth as to force the welding system above the short arc transition into globular transfer.

Figure 8:
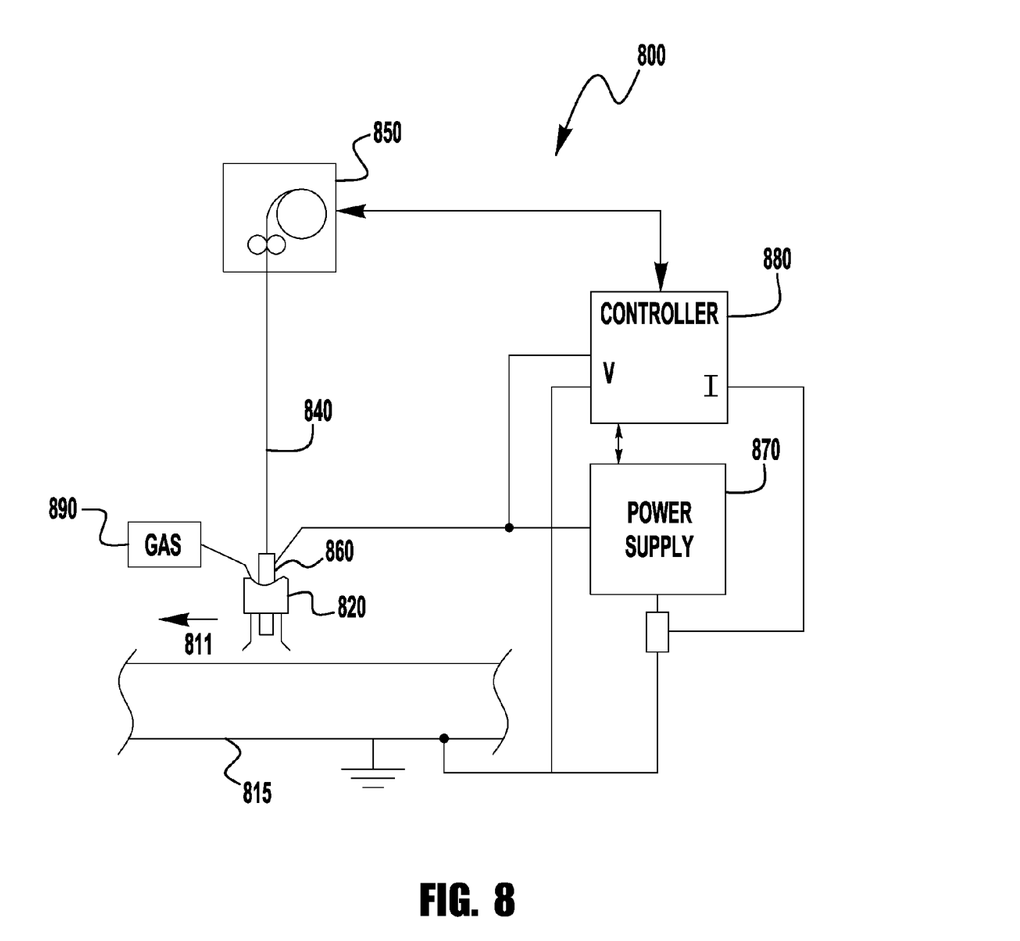
FIG. 8 illustrates a functional block diagram of an exemplary embodiment of a welding system consistent with the present invention.

In another embodiment, the consumable electrode/wire is manipulated to improve arc stability during the short arc welding process. For example, the wire feed speed and/or direction of the consumable electrode/wire can be varied or changed at predetermined points of the short arc welding waveform. As illustrated in FIG. 8, a welding system 800 includes a welding power supply 870 that outputs a welding waveform used in a short-circuit transfer GMAW process, for example. The output of power supply 870 is connected to contact tube 860 of torch 820. A consumable electrode 840 is fed from wire feeder 850 to workpiece 815 via contact tube 860 of torch 820. During operation the welding waveform from power supply 870 is sent to the consumable electrode 840 via contact tube 860. The torch 820 is also configured to receive shielding gases such as argon and carbon dioxide from gas supply 890.

A controller 880 can be connected to power supply 870 such that the system 800 performs, e.g., STT short-circuit welding as described in the above-discussed embodiments. That is, the controller 880 can include the modulating waveform generation and shaping capability 220 and the short detection and premonition detection (de-short anticipation) capability 230 functions discussed above. In addition to these functions, the controller 880 can control the wire feeder 850 to manipulate the wire feed speed and/or feed direction of the consumable electrode 840 (e.g., forward or reverse). For example, the controller 880 can be configured to coordinate the wire feed speed and/or direction with the waveform in order to, e.g., improve arc stability. In some embodiments, the feed speed of the consumable electrode 840 is reduced and/or reversed during certain segments of the welding waveform. Of course, although illustrated as a stand-alone controller, the controller 880 can be incorporated into power supply 870 and/or wire feeder 850.

Figure 9:
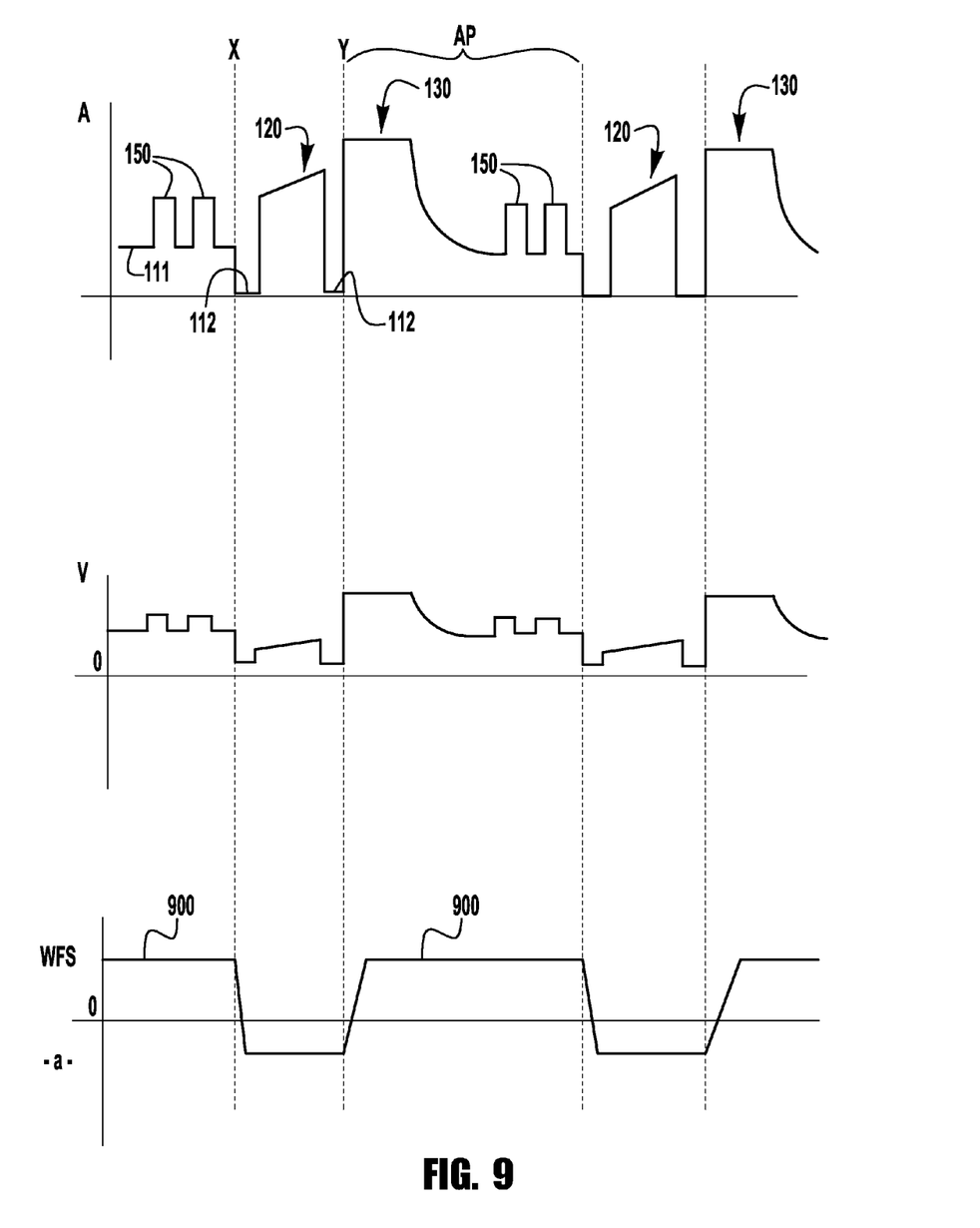
FIG. 9 illustrates exemplary graphs of a welding waveform and wire feed speed as generated by the system of FIG. 8.

In the exemplary system of FIG. 8, along with reducing the welding current to a current level 112 (see FIG. 9) after the detection or prediction of a short as discussed above, the feed speed 900 (which can be a first constant speed) of the consumable electrode 840 can be reduced and/or reversed during the time the consumable electrode 840 is shorted to workpiece 815. As seen in FIG. 9, the consumable electrode 840 is generally fed at a constant speed 900 during, e.g., the arcing phase of the welding operation. For purposes of this exemplary embodiment, the arcing phase AP of the waveform includes the peak current pulse 130 and the following background portion, which may include heating pulses 150. However, when a short is detected or predicted at point X by the controller 880, the controller initiates the welding current reduction (current level 112) as discussed above and also reduces the wire feed speed to a second predetermined value during at least a portion of the shorting phase of the waveform. The predetermined value can be a speed that is less than the wire feed speed 900 during the arcing portion AP of the waveform. For example, the predetermined speed can be set to zero (i.e., advancement of the consumable electrode 840 stops) or set to a reduced value that is above zero but less than the speed during the arcing portion. In some embodiments, the feed direction of the consumable electrode 840 can be reversed and then maintained at a predetermined reverse speed—as shown in FIG. 9.

As seen in the exemplary embodiment illustrated in FIG. 9, after the short is detected or predicted at point X, the wire feed speed is reduced to zero and then the feed direction is reversed until the wire feed speed reaches a predetermined value of −a. In this exemplary embodiment, the reversed feed direction of consumable electrode 840 is then maintained during the time the controller 880 applies the pinch current phase 120 (via power supply 870) to the consumable electrode 840. After the controller 880 initiates the peak current phase 130 (point Y), the wire feed speed of the consumable electrode 840 is increased until it reaches the desired value 900 for the arcing phase of the welding operation. The reduction in speed and/or reversal of the feed direction of the consumable electrode 840, along with application of the pinch current phase 120, helps to facilitate the transfer of the molten metal ball 192 (see FIG. 1) to the workpiece after the short is detected or predicted.

In the above exemplary embodiment, the wire feeder 850 starts to reduce the wire feed speed immediately after the detection or prediction of the short. However, the initiation of the speed reduction for consumable wire 840 can start at other time periods after the short is detected or predicted. In other exemplary embodiments of the invention, the speed reduction can start a predetermined time period after the short is detected or predicted; can be synchronized to start with the initiation of the pinch current phase 120; or can start a predetermined time period after the initiation of the pinch current phase 120. Similarly, the present invention is not limited to increasing the wire feed speed immediately upon initiation of the peak current phase 130 as illustrated in FIG. 9. In other exemplary embodiments, the wire feed speed increase can be synchronized with the termination of the pinch current phase 120 or at a predetermined time after the pinch current phase 120 is terminated. In still other embodiments, the wire feed speed increase can start at a predetermined time period after initiation of the peak current phase 130. Thus, in exemplary embodiments of the invention, the controller 880 can be configured to reduce speed and/or reverse direction during any portion of the reduced current phase 112, pinch current phase 120, and/or the peak current phase 130.

Figure 10:
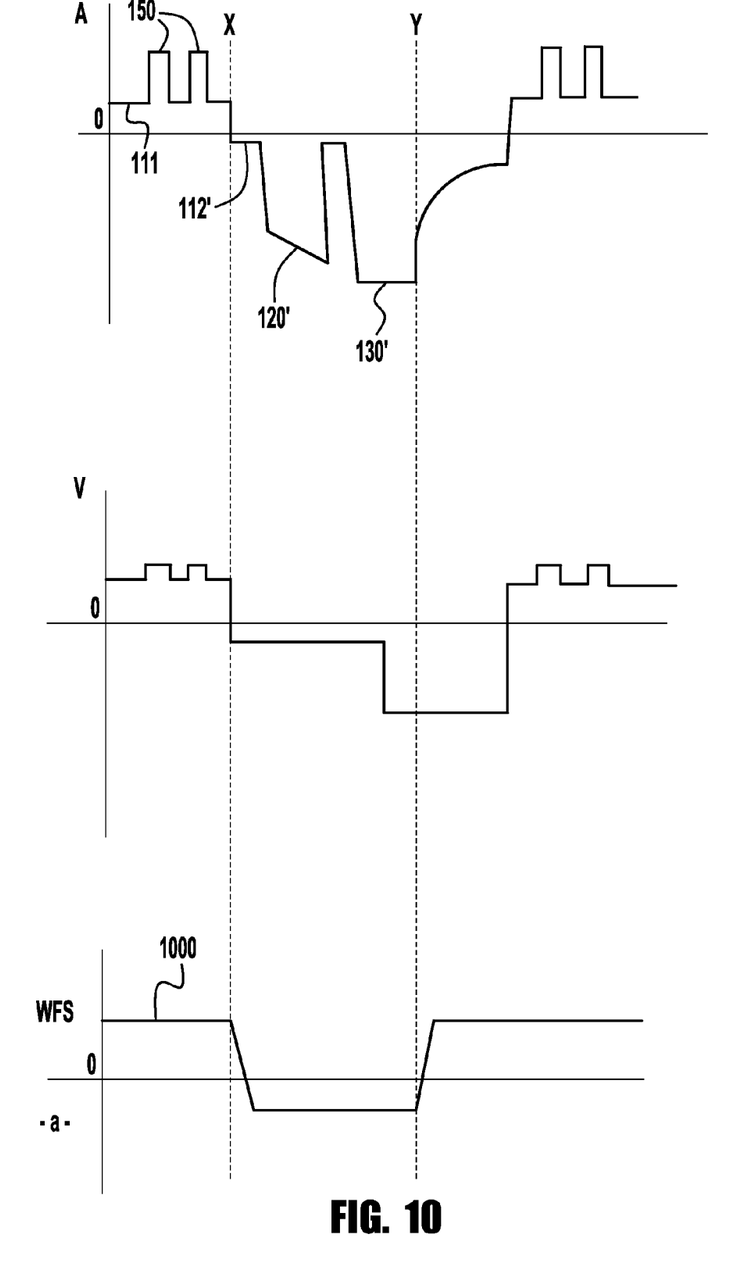
FIG. 10 illustrates exemplary graphs of an AC welding waveform and wire feed speed as generated by the system of FIG. 8.

In the above exemplary embodiments, the welding waveform is a positive DC waveform. However, the present invention can be used in systems that use AC welding waveforms. In some exemplary embodiments that use AC waveforms, portions of the background current phase, including the heat-increasing current pulses, will function as described above. For example, as illustrated in FIG. 10, the background current level 111 and heat-increasing current pulses 150 perform similar functions as described in the exemplary embodiments discussed above. However, in systems that use AC welding waveforms, the welding waveform switches polarity for certain segments of the waveform. For example, in some embodiments, the reduced background current level, the pinch current level, and the peak current level are at an opposite polarity from that of background current level 111 and heat-increasing current pulses 150. As seen in FIG. 10, after a short is detected or predicted at point X, the welding current is reduced from the background current level 111 to zero and then polarity is switched to generate a reduced background current level of 112'. A pinch current is then initiated as discussed in the above embodiments but, in this exemplary embodiment, the polarity of the pinch current 120' (see FIG. 10) is opposite that of pinch current phase 120 shown in FIG. 9. Similarly, a peak current is initiated after the pinch current phase as discussed above, but again, in this exemplary embodiment, the polarity of peak current phase 130' is opposite that of peak current phase in FIG. 9. After the peak current phase 130' is terminated, the welding waveform resumes a background current 111 at positive polarity. During the background current phase, heat-increasing current pulses 150 can be initiated as discussed above to further heat the weld puddle.

In addition, wire manipulation can also be performed in systems that use an AC waveform. As in the above-discussed embodiments, the wire feed speed of consumable electrode 840 can be reduced and/or reversed during the time the consumable electrode 840 is shorted to the workpiece 815. As seen in FIG. 10, the consumable electrode 840 is fed at a predetermined speed 1000 during the arcing phase of the waveform. When a short is detected or predicted at point X, the wire feed speed is reduced and then the feed direction is reversed until the wire feed speed reaches a predetermined value of −a. However, unlike the exemplary embodiment of FIG. 9 in which the wire feed is only reversed during approximately the pinch current phase, in the exemplary embodiment of FIG. 10, the wire feed speed is reversed during approximately the pinch current phase 120' and peak current phase 130'. Once the peak current phase 130' is terminated (point Y), the wire feed speed is increased to the predetermined speed of the arcing phase. As with the positive DC waveform discussed above, in exemplary embodiments of the AC waveform systems, the controller 880 can be configured to reduce speed and/or reverse direction during any portion of the reduced current phase 112', pinch current phase 120', and/or the peak current phase 130'.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

I claim:

1. A welding system, said system comprising:
a power supply that generates an output current waveform and provides said output current waveform to an electrode;
a wire feeder that advances said electrode to a workpiece; and
a controller that controls said power supply such that said output current waveform comprises a base cycle having a background current portion providing a background current level, a peak current portion providing a peak current level, and a tail-out current portion providing a decreasing tail-out current level, where each peak current portion is separated by said background current portion, and said controller controls said wire feeder such that at least one of a feed speed and a feed direction of said electrode are manipulated while controlling said power supply,
wherein said controller controls the power supply such that said power supply generates a plurality of current pulses during each background current portion in between peak current portions,
wherein said plurality of current pulses during said background current portion have a current level which is intermediate to said background current level and said peak current level, and
wherein the current level for each of said plurality of current pulses in any one background current portion is the same.

2. The system of claim 1, wherein said controller controls said power supply such that a pinch current portion is generated between said background current portion and said peak current portion, and a low current level is generated in said waveform below said background current level, and
wherein said feed speed is reduced below a background speed set during said background current portion, said feed speed reduction occurring during at least a portion of at least one of said low current level, said pinch current portion and said peak current portion.

3. The system of claim 1, wherein said controller controls said power supply such that a pinch current portion is generated between said background current portion and said peak current portion, and a low current level is generated in said waveform below said background current level, and
wherein said feed direction is reversed during at least a portion of at least one of said low current level, said pinch current portion and said peak current portion.

4. The system of claim 2, wherein said feed speed is reduced to zero.

5. The system of claim 2, wherein said feed speed is reduced to a value that is above zero and less than said background speed.

6. The system of claim 2, wherein said feed speed is reduced in synchronization with an initiation of at least one of said low current level and said pinch current portion.

7. The system of claim 6, wherein said feed speed is increased to said background speed in synchronization with an initiation of said peak current portion.

8. The system of claim 2, wherein said feed speed is reduced a first predetermined time period after an initiation of said low current level or said pinch current portion.

9. The system of claim 8, wherein said feed speed is increased to said background speed after a second predetermined time period after an initiation of said peak current portion.

10. The system of claim 3, wherein said feed direction reversal is initiated in synchronization with an initiation of said low current level or said pinch current portion.

11. The system of claim 10, wherein a change in said feed direction to a forward direction is initiated in synchronization with an initiation of said peak current portion.

12. The system of claim 3, wherein said feed direction reversal is initiated a first predetermined time period after an initiation of said low current level or said pinch current portion.

13. The system of claim 12, wherein a change in said feed direction to a forward direction is initiated after a second predetermined time period after an initiation of said peak current portion.

* * * * *